United States Patent [19]

Vogelsang et al.

[11] Patent Number: 5,779,008
[45] Date of Patent: Jul. 14, 1998

[54] DRIVE UNIT WITH ENGINE AND RETARDER

[75] Inventors: Klaus Vogelsang; Jurgen Friedrich, both of Crailsheim; Hans Gebhardt, Langenzenn; Heribert Moller, Sachsen, all of Germany

[73] Assignee: Voith Turbo GmbH & Co. KG, Germany

[21] Appl. No.: 540,205

[22] Filed: Oct. 6, 1995

[30] Foreign Application Priority Data

Oct. 12, 1994 [DE] Germany ............... P 44 36 344.3

[51] Int. Cl.⁶ ........................... B60T 1/087; F01P 5/10
[52] U.S. Cl. ........................................... 188/296
[58] Field of Search ........................ 188/296, 290, 188/293, 294

[56] References Cited

U.S. PATENT DOCUMENTS

| | | | |
|---|---|---|---|
| 2,790,518 | 4/1957 | Wilson | 188/296 X |
| 2,827,989 | 3/1958 | Christenson | 188/296 X |
| 2,889,013 | 6/1959 | Schneider | 188/296 X |
| 3,051,273 | 8/1962 | Cordiano et al. | 188/296 X |
| 3,124,218 | 3/1964 | Montgomery | 188/296 X |
| 3,650,358 | 3/1972 | Bessiere | 188/296 |
| 3,720,372 | 3/1973 | Jacobs | 237/12.3 B |

FOREIGN PATENT DOCUMENTS

| | | |
|---|---|---|
| 0 071 807 | 2/1983 | European Pat. Off. . |
| 1946167 C3 | 11/1975 | Germany . |
| 3301560 C1 | 4/1984 | Germany . |
| 3713580 C1 | 11/1988 | Germany . |

*Primary Examiner*—Peter M. Poon
*Attorney, Agent, or Firm*—Baker & Daniels

[57] ABSTRACT

A drive unit comprising an engine, a transmission, a hydrodynamic retarder comprised of a rotor impeller wheel, a stator impeller wheel and a retarder housing enclosing both. A coolant circuit having coolant also serves as a working fluid of the retarder, and a pump impeller wheel is arranged coaxially with the rotor impeller wheel of the retarder which is used to circulate the coolant. Given this configuration, the space needed by the units which perform the pumping and braking functions of the drive unit are minimized while the efficiency of the pumping and braking functions are maximized.

25 Claims, 5 Drawing Sheets

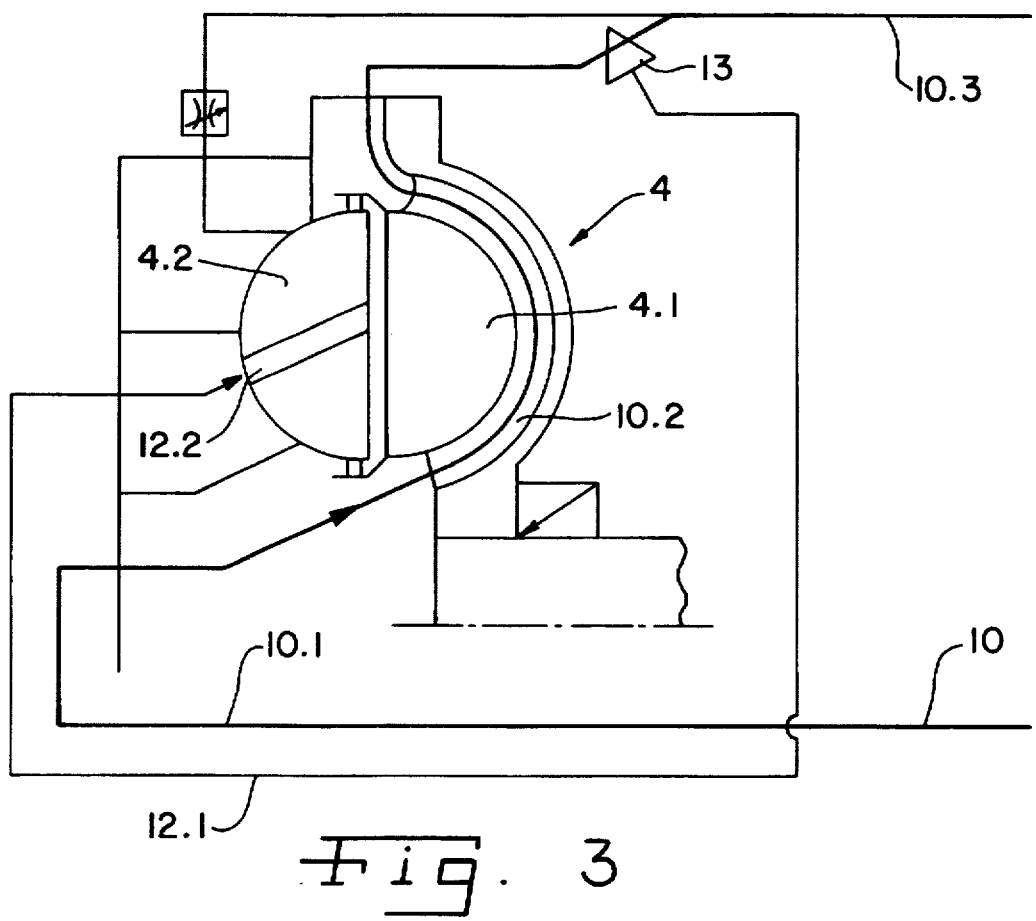
Fig. 3
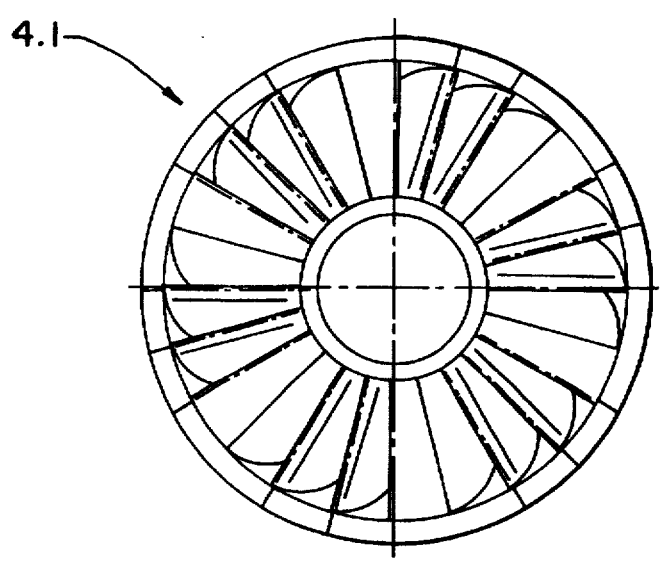
Fig. 4.1

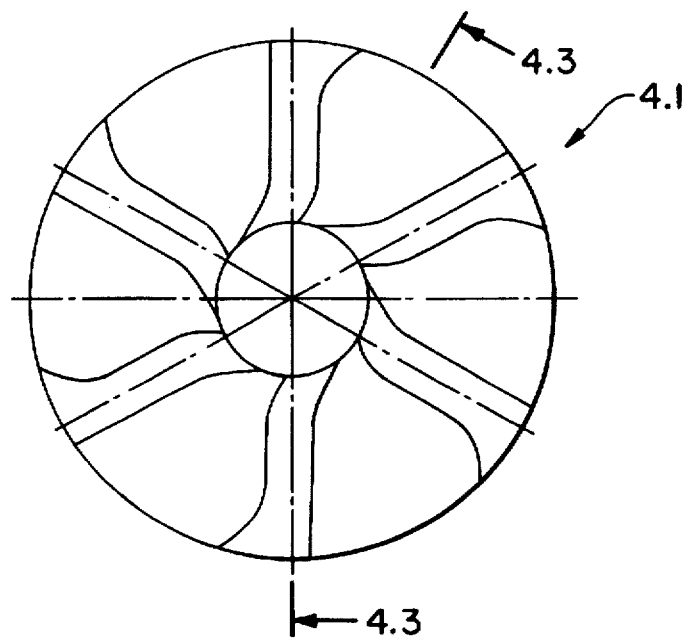
Fig. 4.2
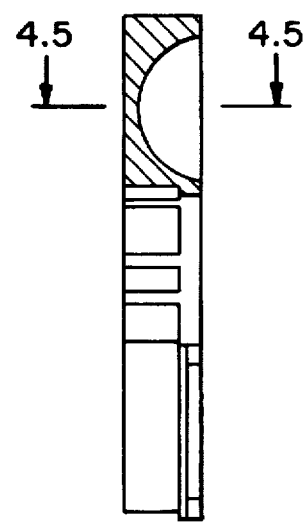
Fig. 4.3
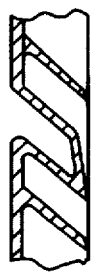
Fig. 4.4
Fig. 4.5
Fig. 4.6

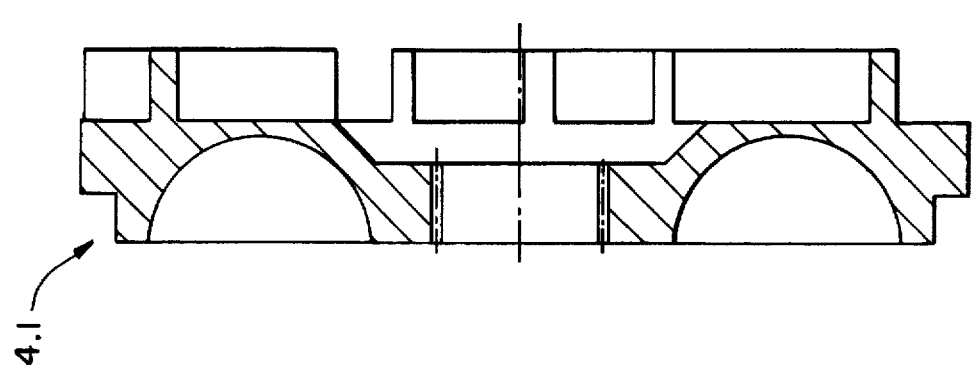
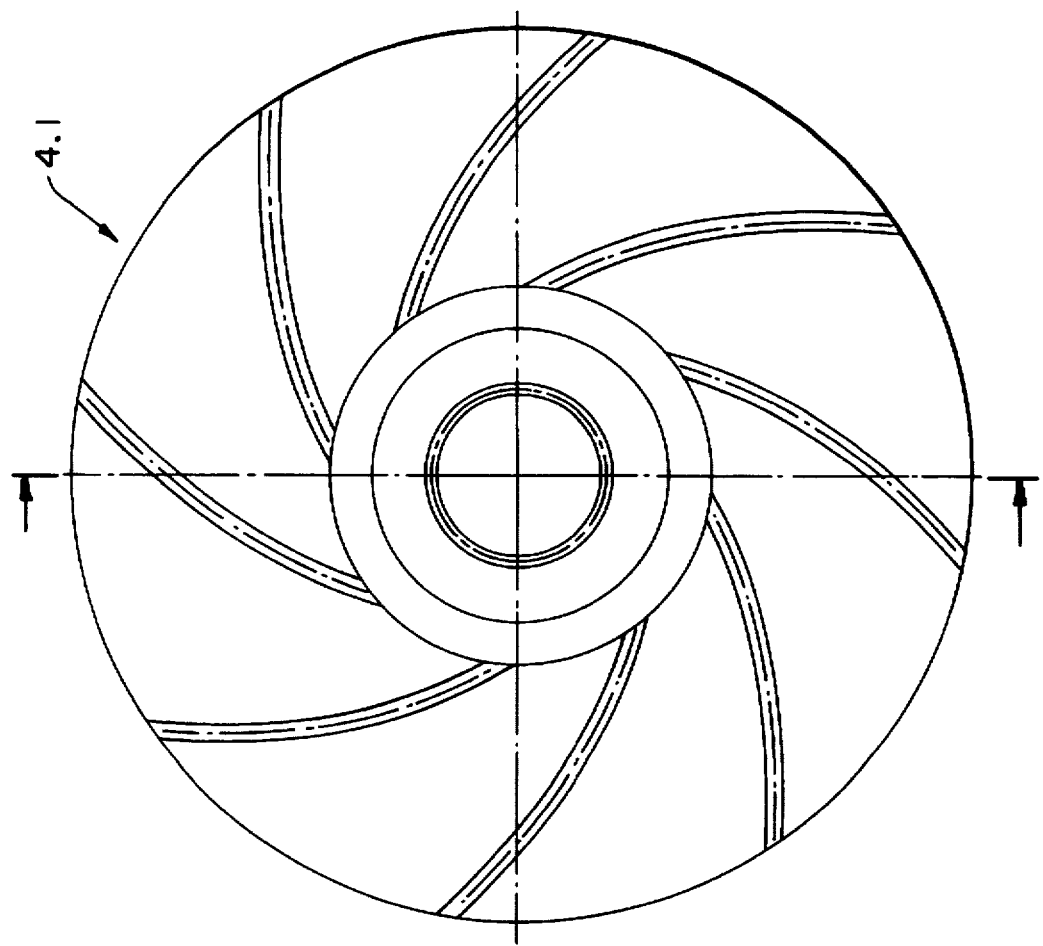

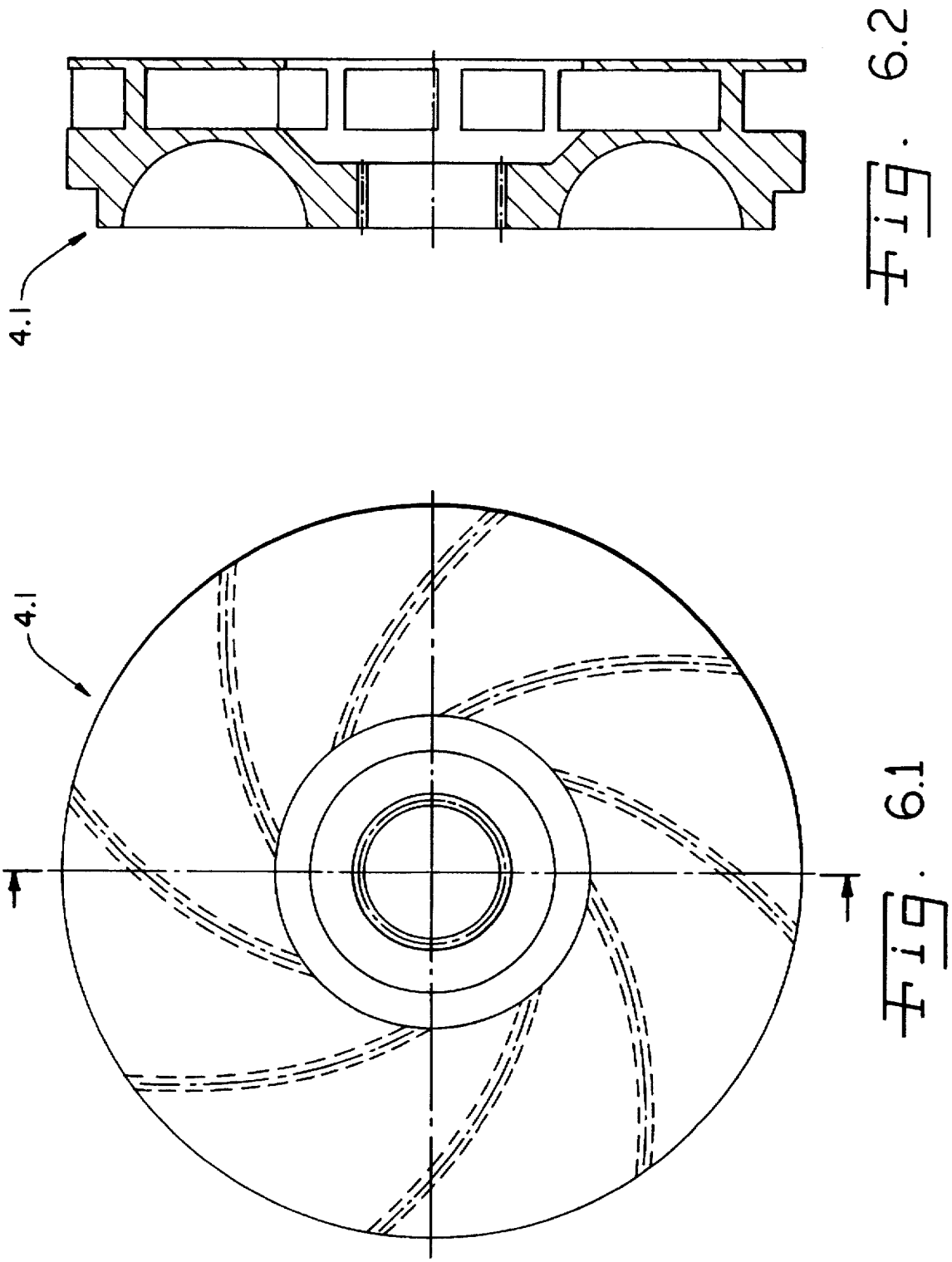
Fig. 6.1
Fig. 6.2

DRIVE UNIT WITH ENGINE AND RETARDER

BACKGROUND OF THE INVENTION

The invention relates to a drive unit comprising an engine, a transmission, a hydrodynamic retarder having a housing which encloses a rotor impeller wheel and a stator impeller wheel, and a coolant circuit having a coolant which also serves as the working fluid of the retarder. Such a drive unit is disclosed in German Patent No. DE 37 13 580 C1.

The retarder disclosed in the prior art circulates the coolant in the cooling circuit of the vehicle cooling system during both regular traction operation and during sustained braking (water pump retarder). A suitable valve arrangement controls the retarder in such a way that it can also perform braking work when needed. The power consumed during the "pumping" function should be as low as possible, whereas the "braking" function should be as high as possible. Since these technical requirements are at opposite ends of the spectrum, excessive power is consumed during the "pumping" function which therefore causes the prior art device to operate inefficiently.

Conversely, when the "pumping" and "braking" functions are separately performed by providing a pump in addition to a retarder, the "braking" and "pumping" functions can be carried out with optimum efficiency. However, such a system is disadvantageous because it requires a relatively large amount of space in an area of a vehicle which is already very congested.

The retarder disclosed in U.S. Pat. No. 3,720,372 is integrated in the drive engine, permanently joined to the crankshaft, and constantly flooded by the coolant of the cooling system. The rotor of the retarder serves as a circulation pump, instead of using a separate cooling pump. The purpose of this system is to heat the coolant by means of the retarder in order to heat the passenger compartment. This objective is also accomplished by arranging a controller on the retarder which distributes the coolant, depending on its temperature in a bypass line, through the radiator.

German Patent No. 33 01 560 discloses a retarder which employs a switchable clutch connected to the crankshaft of the engine and the driven wheels of the vehicle. However, the task of the retarder is not the absorption of high kinetic energy from the vehicle and its conversion to heat. Rather, the retarder operates exclusively as a heating unit whereby the heat output is controlled under allowance for an available powered input. The coolant of the engine also serves as the operating fluid of the retarder.

German Patent No. 1 946 167 and U.S. Pat. No. 3,650,358 discloses a retarder joined directly to the crankshaft of an internal combustion engine whose coolant also serves as operating fluid of the retarder. The advantage of this configuration is that the heat which develops in the coolant is passed directly to the radiator, which makes a heat exchanger between two fluids dispensable.

SUMMARY OF THE INVENTION

The objective underlying the invention is to configure a drive unit comprising an engine, a transmission, a hydrodynamic retarder having a housing which encloses a rotor impeller wheel and a stator impeller wheel, and a coolant circuit having a coolant which also serves as the working fluid of the retarder wherein the space required for the "pumping" and "braking" functions will be as minimal as possible, while the functions are performed as efficiently as possible.

This objective is accomplished by the present invention which is a drive unit comprising an engine, a transmission, a hydrodynamic retarder having a housing which encloses a rotor impeller wheel and a stator impeller wheel, a coolant circuit having a coolant which also serves as the working fluid of the retarder, and a pump impeller wheel arranged coaxially with the rotor impeller wheel for circulating the coolant.

Accordingly, a solution is suggested in which a retarder and a pump impeller wheel are arranged coaxially with the shaft of the rotor impeller wheel of the retarder and the shaft of the pump impeller wheel in alignment. This configuration results in a relatively compact design in which the "pumping" and "braking" functions are performed separately and therefore optimally. The separate retarder allows the "braking" function to be optimized, while the separate pump impeller wheel allows optimization of the "pumping" function.

BRIEF DESCRIPTION OF THE DRAWINGS

The above mentioned and other features and advantages of this invention and the manner of obtaining them will become more apparent and the invention will be better understood by reference to the following description of an embodiment of the invention taken in conjunction with the accompanying drawings, wherein:

FIG. 3 is a schematic view of the retarder and a two-way valve positioned to obtain a stronger braking effect;

FIG. 4.1 is a plan view of the combined impeller wheel on the rotor impeller part;

FIG. 4.2 is a plan view of the pump part of the combined impeller wheel;

FIG. 4.3 is a cross-sectional view of the combined impeller wheel on the rotor impeller part;

FIGS. 4.4, 4.5, and 4.6 are cross-sectional views of the pump part of the combined impeller wheel;

FIG. 5.1 is a plan view of a further embodiment of the pump part;

FIG. 5.2 is a cross-sectional view of a further embodiment of the combined impeller wheel;

FIG. 6.1 is a plan view of a still further embodiment of the pump part; and

FIG. 6.2 is a cross-sectional view of a still further embodiment of the combined impeller wheel.

DETAILED DESCRIPTION OF THE INVENTION

Figure 1:
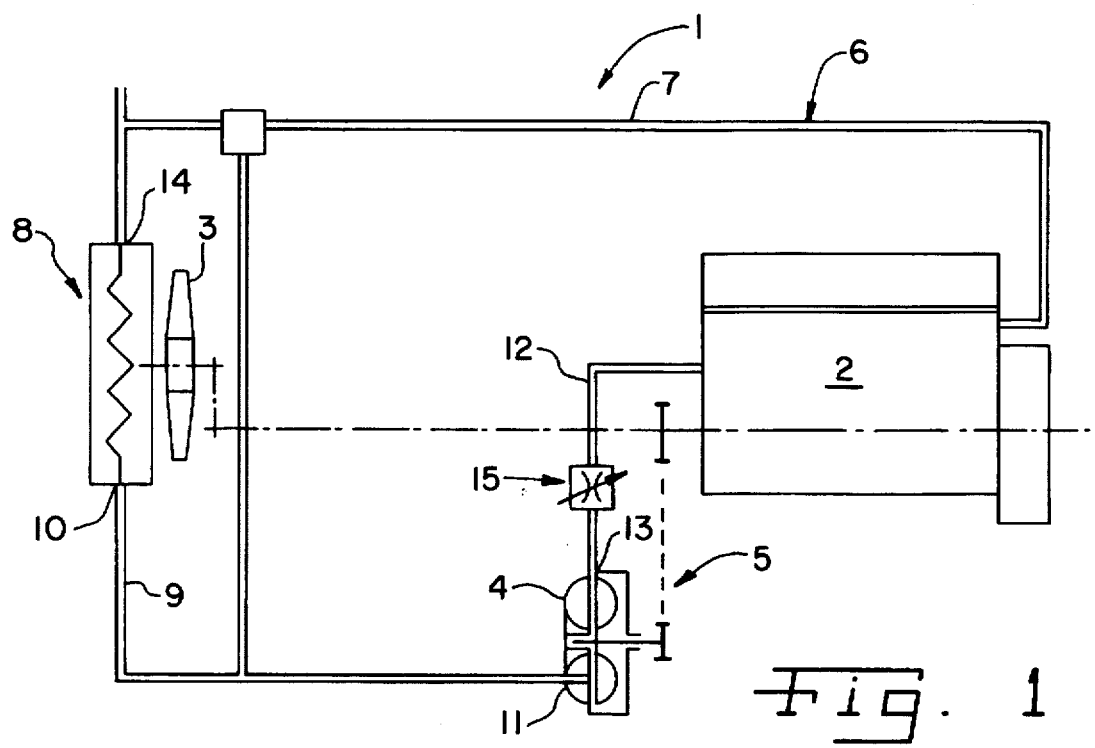
FIG. 1 depicts a schematic view of the drive unit.

FIG. 1 generally illustrates the invention showing a retarder arranged in front of a transmission. Drive unit 1 is comprised of an engine and transmission 2, and a hydrodynamic retarder 4. Retarder 4 is constantly in drive connection with engine 2, specifically the crankshaft of engine 2. As shown in FIG. 1, retarder 4 is in constant rotary connection with engine 2 via back gearing 5. Coolant circuit 6 is common to retarder 4 and engine 2. Coolant 7 of circuit 6 also serves as the working fluid for the retarder 4. Retarder 4 is configured to allow for constant and complete filling with working fluid 7. Due to the arrangement of the retarder 4 and the direction of force flow before the transmission, retarder 4 remains coupled to the engine 2 in any state of operation. For this reason, retarder 4 can also be utilized as a pump for circulation of coolant 7, so that no idling load accrues in the retarder 4 that consumes power and creates heat. Radiator 8 with fan 3 is provided in the coolant circuit 6. Fan 3 may be driven by engine 2 or by retarder 4. Line 9 extends from outlet 10 of radiator 8 to fluid inlet 11 of retarder 4, while line 12 extends from fluid outlet 13 of retarder 4 to fluid inlet 14 of radiator 8 via the engine 2. Valve 15 is fitted within line 12 to allow continuous variation of the cross-section of line 12 from 7 to 0.5 in relation to line 9. In traction operation, for example when retarder 4 is not activated, retarder 4 acts as a circulation pump for coolant 7 in coolant circuit 6. In this case, the cross-section of line 9 is preferably equal to the cross-section of line 12. In other words, during nonbraking operation valve 15 has a large open-flow cross-section through which coolant 7 circulates in coolant circuit 6 of drive unit 1 at low back pressure.

Figure 2:
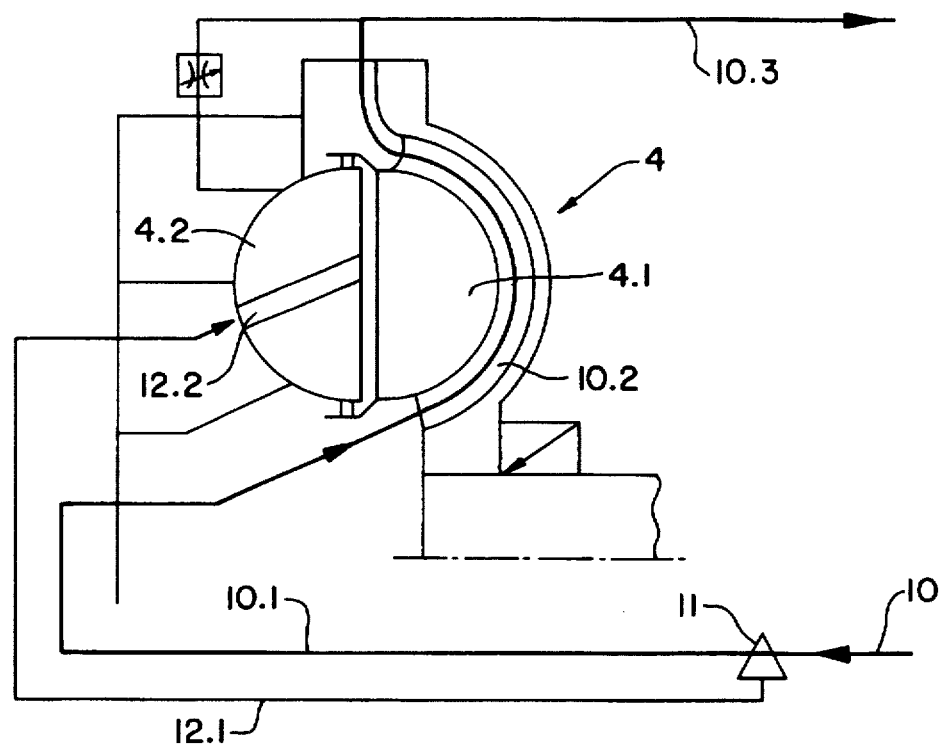
FIG. 2 is a schematic view of the retarder and a two-way valve which allows switching of the coolant from a pumping function to a braking function.

FIG. 2 schematically shows retarder 4 along with its environs, notably the pertaining lines. Rotor impeller wheel 4.1 and the stator impeller wheel 4.2 are also shown in detail. Coolant line 10 approaches from radiator 8. A first two-way valve 11 allows switching of drive unit 1 from a pumping function to a braking function. During the pumping function, coolant 7 is meant to be circulated exclusively. Therefore, coolant 7 proceeds through line 10.1 to combined rotor-pump impeller wheel 4.1, where it flows through pump duct 10.2. From that point, coolant 7 proceeds through a further line 10.3 to engine 2.

When braking is intended, coolant 7 proceeds along line 12.1 and through duct 12.2 to stator impeller wheel 4.2, and into the working space of retarder 4. Thus, in strict pump operation, the working fluid flow proceeds only through the pump part of the rotor, whereas in brake operation the working fluid flow passes only through retarder 4.

The embodiment according to FIG. 3 shows an especially interesting solution. During braking operation, pump duct 10.2 can be flooded first, whereafter the working fluid flow can be returned and passed into retarder part 4 by means of another two-way valve 13. This offers the advantage that in the absence of external pressure, for example when external pressure is superposed, the pump part of the combined rotor-pump impeller wheel 4.1 is used to impart a high pressure on the working fluid and thereby obtain a stronger braking effect.

As apparent from the above description and FIGS. 2 and 3, in both illustrated embodiments a bypass line, directing coolant flow around the retarder, is formed between valves 11, 13, in FIGS. 2 and 3 respectively, and the point at which the retarder output is joined to line 10.3.

FIG. 4 shows an embodiment where the combined rotor-pump impeller wheel 4.1 is made of virtually only a single wall.

While this invention has been described as having a particular design, the present invention can be further modified within the spirit and scope of this disclosure. This application is therefore intended to cover any variations, uses, or adaptations of the invention using its general principles. Further this invention is intended to cover such departures from the present disclosure as come within known and customary practice in the art to which this invention pertains and which fall within the limits of the appended claims.

What is claimed is:

1. A drive unit, comprising:
    an engine;
    a transmission;
    a hydrodynamic retarder having a housing enclosing a rotor impeller wheel and a stator impeller wheel, said rotor impeller wheel having a back side;
    an engine coolant circuit having coolant also serving as the working fluid for said retarder, said coolant circuit having a bypass line for conveying coolant, said bypass line arranged parallel to said retarder whereby the coolant may be selectively directed around said retarder; and
    a pump impeller wheel, said pump impeller wheel for circulating the coolant arranged coaxially with said rotor impeller wheel of said retarder, said pump impeller wheel being disposed in said coolant circuit in one of two positions, said two positions being a first position ahead of said bypass line in the coolant flow direction and a second position in said bypass line.

2. A drive unit as recited in claim 1, wherein said rotor impeller wheel and said pump impeller wheel are arranged on the same shaft.

3. A drive unit as recited in claim 2, wherein said pump impeller wheel is arranged within said retarder housing.

4. A drive unit as recited in claim 3, wherein said rotor impeller wheel and said pump impeller wheel are integral.

5. A drive unit as recited in claim 4, further comprising pump blades arranged on said back side of said rotor impeller wheel.

6. A drive unit as recited in claim 2, wherein said stator impeller wheel is arranged between said rotor impeller wheel and said pump impeller wheel.

7. A drive unit as recited in claim 2, wherein said rotor impeller wheel and said pump impeller wheel are integral.

8. A drive unit as recited in claim 7, further comprising pump blades arranged on said back side of said rotor impeller wheel.

9. A drive unit as recited in claim 8, further comprising rotor blades and pump blades, said rotor blades and pump blades forming a single wall.

10. A drive unit as recited in claim 7, further comprising rotor blades and pump blades, said rotor blades and pump blades forming a single wall.

11. A drive unit as recited in claim 2, wherein said rotor impeller wheel is arranged between said stator impeller wheel and said pump impeller wheel.

12. A drive unit as recited in claim 1, wherein said pump impeller wheel is arranged within said retarder housing.

13. A drive unit as recited in claim 12, wherein said stator impeller wheel is arranged between said rotor impeller wheel and said pump impeller wheel.

14. A drive unit as recited in claim 12, wherein said rotor impeller wheel and said pump impeller wheel are integral.

15. A drive unit as recited in claim 14, further comprising pump blades arranged on said back side of said rotor impeller wheel.

16. A drive unit as recited in claim 14, further comprising rotor blades and pump blades, said rotor blades and pump blades forming a single wall.

17. A drive unit as recited in claim 12, wherein said rotor impeller wheel is arranged between said stator impeller wheel and said pump impeller wheel.

18. A drive unit as recited in claim 1, wherein said stator impeller wheel is arranged between said rotor impeller wheel and said pump impeller wheel.

19. A drive unit as recited in claim 1, wherein said rotor impeller wheel and said pump impeller wheel are integral.

20. A drive unit as recited in claim 19, further comprising pump blades arranged on said back side of said rotor impeller wheel.

21. A drive unit as recited in claim 20, further comprising rotor blades and pump blades, said rotor blades and pump blades forming a single wall.

22. A drive unit as recited in claim 19, further comprising rotor blades and pump blades, said rotor blades and pump blades, forming a single wall.

23. A drive unit as recited in claim 1, wherein said pump impeller wheel is disposed in said first position ahead of said bypass line in the coolant flow direction.

24. A drive unit as recited in claim 1, wherein said pump impeller wheel is disposed in said second position in said bypass line.

25. A drive unit as recited in claim 1, wherein said rotor impeller wheel is arranged between said stator impeller wheel and said pump impeller wheel.

* * * * *